Nov. 7, 1961 F. B. BERGER ET AL 3,008,138
RADAR SYSTEM

Filed Sept. 1, 1955 3 Sheets-Sheet 1

INVENTORS
FRANCE B. BERGER
FRANZ B. TUTEUR
BY
*H. S. Mackey*
ATTORNEY

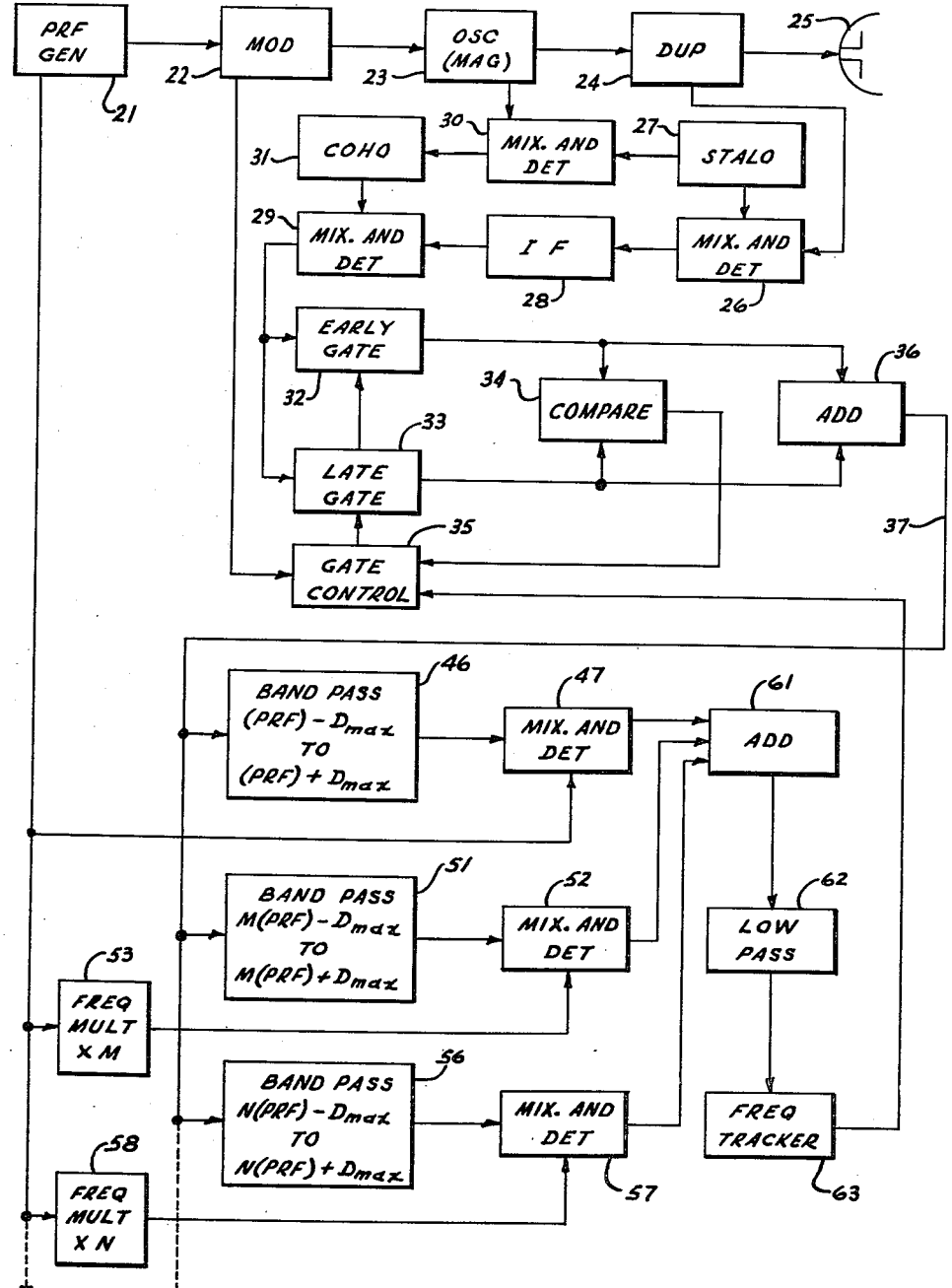

3,008,138
RADAR SYSTEM
France B. Berger, Pleasantville, N.Y., and Franz B. Tuteur, Hamden, Conn.; said Berger assignor to General Precision, Inc., a corporation of Delaware
Filed Sept. 1, 1955, Ser. No. 531,921
13 Claims. (Cl. 343—17.1)

This invention relates to apparatus for improving the signal-to-noise ratio in pulsed radar systems.

There are essentially two basic approaches which may be used for increasing the signal-to-noise ratio of a radar set. The first, and perhaps the most obvious, approach is simply to increase the transmitted power, or to confine it to narrower and more sharply defined beams. Much has been done in recent years to increase radar signals in this fashion, but it appears that practical limits on further increases are now being reached.

The other basic approach involves using more of the information content of the signal than is normally used to improve the signal-to-noise ratio. A number of systems, using various types of information, can be devised to improve the signal-to-noise ratio. If, for instance, it is known that desired signals come only from moving targets, receivers can be built which are practically insensitive to echoes from stationary targets. This technique, known as moving target indication (MTI) has been in use for a number of years and effectively removes the type of radar noise referred to as "ground cluttter."

Another technique that makes use of information about the signal is the range gate. The information that is used here is that the target is at a certain range from the ground station, and that this range is changing only slowly. By means of the gate the receiver is turned on only during the short period of time during which the desired signal is expected. In this way most of the thermal and shot-effect noise generated in the receiver can be eliminated, and at the same time unwanted echoes are rejected.

A further piece of information that can be utilized is the fact that the frequency spectrum of the returned signal from a coherently pulsed transmitter is not continuous but consists of many discrete sidebands separated by multiples of the pulse repetition frequency. In the case of an incoherently pulsed transmitter the R.-F. spectrum is actually continuous, but various techniques of coherent demodulation can be employed to yield a discrete post-detector spectrum containing many sidebands. The usual radar system discards all but one of these sidebands, along with the noise accompanying them. However, the spectrum of noise is not, in general, of the same form as that of the signal so that it is frequently possible to improve the signal-to-noise ratio by utilizing some of the additional sidebands.

When it is possible to use a range gate the width of which does not exceed the width of the transmitted pulse, it appears that the maximum improvement in signal-to-noise ratio is obtained and that there is no advantage in using more than one of the discrete signal sidebands mentioned above. Narrow range gates may be used to advantage when the signal-to-noise ratio is adequate, particularly with targets which are stationary or which are moving so slowly with respect to the radar set that there is little danger of the signal being lost by moving out of the gate.

In some situations no range gate at all can be used, or at most, only a wide gate. For example, a search radar is expected to pick up targets which may appear within a wide variety of distances from the radar. As another example, some Doppler radar navigation systems receive echoes during substantially the entire period between transmitter pulses. In such cases methods can be devised for the use of a large number of the sidebands to yield a signal-to-noise ratio improvement comparable to that attainable by the use of a narrow range gate. However, each sideband utilized requires a sharply tuned bandpass filter so that if a large number of sidebands, say fifty or one hundred, are utilized, the receiving apparatus becomes quite bulky and complex.

Even though it may not be possible to use a range gate as narrow as the transmitted pulses, it is often possible to use a wider range gate thereby improving the signal-to-noise ratio to some extent. For example, a search radar may be required to search only within definite range limits. As another example, some Doppler navigation systems receive signals during only a portion of the time between transmitter pulses. As yet another example, tracking radars may require a range gate considerably wider than the transmitter pulse in order to avoid losing the signal, since the servo mechanisms controlling the gate must have limitations imposed on their speed of operation in order to discriminate against noise, and hence they may have their limits exceeded when the targets being tracked have high velocities and/or accelerations. With a gate wider than the transmitted pulse the signal to noise ratio is not optimum and if many sidebands are utilized the apparatus becomes very complex.

It is an object of the present invention to improve the signal-to-noise ratio of a radar system when using a range gate wider than the transmitted pulse.

Another object of the invention is to improve the signal-to-noise ratio of a radar system by means of simple apparatus.

Briefly stated, a radar system in accordance with the invention employs a range gate substantially wider than the transmitted pulse. The signal utilized comprises that contained in either the lowest or the next to the lowest frequency band after demodulation plus that contained in certain selected higher order sidebands. The higher order sidebands selected depend upon, among other parameters, the pulse width, the gate width, and the pulse repetition frequency. By this technique, a signal-to-noise ratio improvement, comparable to that obtainable with a narrow gate, can be achieved by using only a few sidebands.

For a clearer understanding of the invention, reference may be made to the following detailed description and the accompanying drawing, in which:

FIGURE 11 is a block diagram of a preferred embodiment of the invention; and

Figure 1:
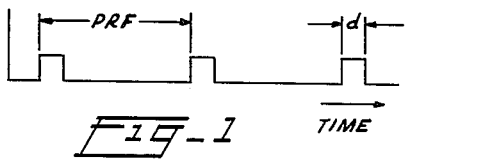
FIGURE 1 is a diagram depicting the envelope of the radio frequency pulses of microwave energy transmitted by a radar transmitter.
Figure 2:
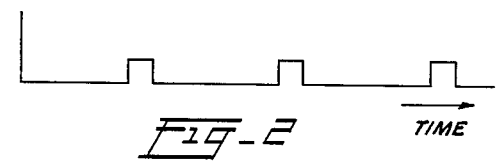
FIGURE 2 is a diagram depicting the envelope of the radio frequency pulses returned to a radar receiver, after reflection from an object.

Referring first to FIG. 1, there is shown, in idealized form, the envelope of the pulses transmitted by a pulse radar system as a function of time. FIG. 2 shows the signals received by a receiver after the transmitted pulses have been reflected by an object. It will be understood that the receiver also picks upon noise at all times. If the curve of FIG. 2 is regarded as the video signal after demodulation, the noise will include not only that picked up by the antenna but also noise generated within the receiver. The conventional range gate, used in many radar systems, turns the receiver on only during those time intervals during which returned signals are expected. If the objects are stationary, or moving only slowly with respect to the radar system, a very narrow gate may be used, having approximately the same width as the transmitted pulse, thereby rejecting all the noise between pulses and achieving the optimum signal-to-noise ratio.

FIG. 2 has been drawn to represent the envelope of the R.-F. echoes reflected from a stationary target, in which case the spacing between pulses is the same for the received pulses as for the transmitted pulses. If the target is moving with respect to the radar system, the spacing between received pulses will be different from that between transmitted pulses. In other words, the pulse repetition frequency will be Doppler shifted. However, for target speeds normally encountered, this Doppler shift is so small that for most instrumentation purposes it may be ignored. For example, if the pulse repetition frequency is 50 kilocycles per second, the Doppler shift for a target moving at 1,000 m.p.h. would be $$2f\frac{v}{c}$$

(where $f$ is the pulse repetition frequency) or approximately 0.15 cycle per second. Therefore it can be seen that the curve of FIG. 2 is also a valid representation of the echoes reflected from a moving target.

The Doppler shift of the pulse repetition frequency although small, is very real and very important. However, it must not be confused with the Doppler shift of the carrier. For example, if the carrier is in the X band, with a frequency of $10^4$ megacycles per second, the Doppler shift of the carrier will be $$2f\frac{v}{c}$$

(where $f$ is the carrier frequency) or approximately 30 kilocycles per second for a target moving at 1,000 m.p.h.

Figure 3:
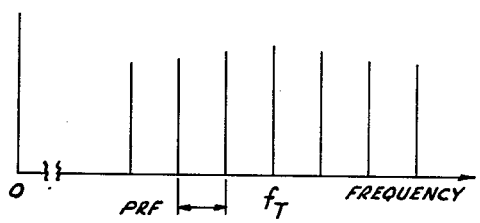
FIGURE 3 is a diagram showing the frequency spectrum of a train of microwave pulses after reflection from a stationary object.
Figure 4:
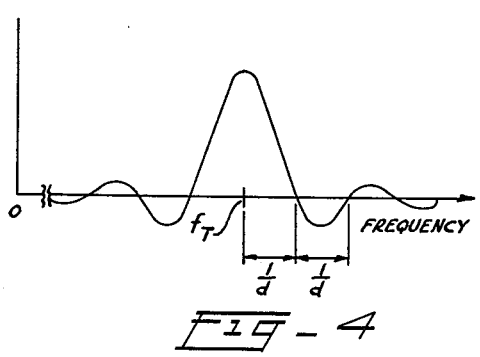
FIGURE 4 shows, on a much smaller frequency scale, the envelope of the sidebands illustrated in FIG. 3.

Consider now the frequency spectrum of a series of pulses, such as those shown in FIG. 2, reflected from a stationary target. Fourier analysis shows that the returned signal spectrum consists of a number of discrete signal frequencies, one at the carrier frequency and others above and below the carrier and separated therefrom by multiples of the pulse repetition frequency. These signal bands are not merely a mathematical fiction but have physical existence and have been observed. FIG. 3 depicts the signal component at the carrier, or transmitter, frequency and a few of the sidebands. FIGURE 4 shows the envelope of the sidebands of FIGURE 3, using a much smaller frequency scale, and shows that the sidebands continue indefinitely and have zero amplitude at frequencies separated from the transmitter frequency by multiples of the reciprocal of the pulse width.

Figure 5:
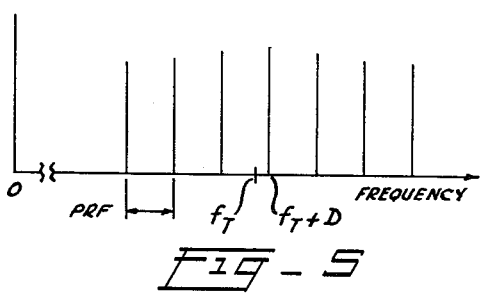
FIGURE 5 is similar to FIG. 3 and shows the frequency spectrum of a train of microwave pulses after reflection from a moving target.

FIGURE 5 shows the spectrum of the signal returned from a moving target. Although this figure is similar to FIG. 3, it should be noted that there is no signal band at the transmitter frequency. The signal band nearest to the transmitter frequency is displaced therefrom by an amount equal to the Doppler shift of the carrier frequency, and the remaining signal bands are separated from this band by multiples of the pulse repetition frequency. Strictly speaking, the various signal bands are separated by multiples of the Doppler shifted pulse repetition frequency, but, as previously explained, this shift is so small that for nearly all purposes the separation may be regarded as being equal to the pulse repetition frequency of the transmitter. Furthermore, the various signal bands are not pure sine waves of a single frequency but, due to the nature of the reflection process for composite targets of practical interest, are bands of frequencies the width of which is large compared to the Doppler shift in the pulse repetition frequency but small compared to the Doppler shift in the carrier frequency.

Figure 6:
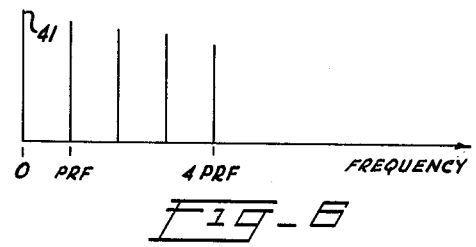
FIGURE 6 shows the frequency spectrum of the pulses reflected from a stationary target after demodulation in the receiver.

FIGURE 6 shows the frequency spectrum of the signal returned from a stationary target, after demodulation in the receiver. There is one signal component or band near zero frequency and additional bands at multiples of the pulse repetition frequency.

Figure 7:
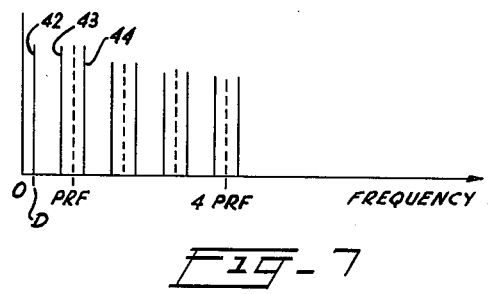
FIGURE 7 shows the frequency spectrum of the pulses reflected from a moving target after coherent demodulation in the receiver.

FIG. 7 shows the frequency spectrum of the signal returned from a moving target after coherent demodulation. There is one signal band displaced from zero by the amount of the Doppler shift of the transmitter frequency and two signal bands displaced respectively above and below each multiple of the pulse repetition frequency by a like amount.

In most radar receivers, whether receiving signals from stationary targets as depicted in FIG. 6 or from moving targets as depicted in FIG. 7, a low-pass filter follows the demodulator so that all of the signal bands of higher frequency than the zero order sideband are rejected. This is a perfectly sound practice since all of the signal sidebands contain exactly the same information and therefore no signal borne information is lost by rejecting the higher order sidebands. Furthermore, the noise in that portion of the frequency spectrum above the zero order signal band is also rejected. Analysis shows that, if a narrow range gate is used the width of which is approximately equal to the width of the transmitted pulse, no improvement in the signal-to-noise ratio can be obtained by using more than one of the signal sidebands.

As previously mentioned, there are some applications of radar systems, such as some search radars and some Doppler radar navigation systems, in which no range gate at all may be used. In such cases many adjacent sidebands can be utilized to obtain an improved signal-to-noise ratio. Such a system is described and claimed in the copending application of France B. Berger, Serial No. 403,680, filed January 13, 1954, for Doppler Radar Instrument, now U.S. Patent No. 2,896,205, issued July 21, 1959. In that application apparatus is described which diverts the various signal bands into separate channels and then recombines them. A substantial improvement in signal-to-noise ratio is thereby achieved.

The present invention is applicable to those radar systems which employ a range gate substantially wider than the transmitted pulse but of shorter duration than the interpulse period. As previously mentioned, such systems may include some Doppler navigation systems and some search or tracking radar systems. For example, a ground control approach (GCA) radar may be required to scan a sector of space continuously and also to track one or more targets appearing within the space. Since such a system "looks" at the target only periodically, and is generally required to operate at low signal-to-noise ratios, a wide gate is desired to avoid losing the target between scans.

Figure 8:
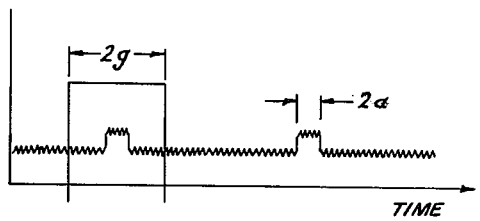
FIGURE 8 depicts a returned pulse and a range gate wider than the pulse.

FIG. 8 shows a train of returned pulses and a range, or time, gate substantially wider than the signal pulse. The gate rejects much of the noise, but allows the noise within the gate to pass. It has been found that under these circumstances considerable improvement in the signal-to-noise ratio can be obtained by specially selecting and utilizing several of the sidebands depicted in FIG. 7.

In investigating the improvement in signal-to-noise ratio obtainable by using more than one sideband, it is convenient to designate that sideband which is displaced from zero by the Doppler frequency as the zero order channel and to designate the two sidebands displaced above and below each multiple of the pulse repetition frequency as a channel bearing the number of the multiple of the pulse repetition frequency. For example, the "fourth channel" designates the two sidebands displaced by the Doppler frequency above and below the fourth multiple of the pulse repetition frequency.

Intuition suggests, and analysis confirms, that if but one channel is used, the first channel (consisting, as it does, of two sidebands) has a signal-to-noise ratio approximately twice that of the zero order channel. Let us suppose, then, that the zero order channel be omitted and that the first order channel be used, and that we consider the improvement possible by the use of channels in addition to the first. It can be shown that the factor, $\mu$, by which the use of the first and additional channels improves the signal-to-noise ratio relative to the use of the zero order channel alone may be expressed as $$\mu = \frac{2\left(1+\frac{4\pi\Gamma_c}{g\omega_r}\right)\left[\sum_{l=1}^{L}\lambda(l)\left(\frac{\sin al\omega_r}{al\omega_r}\right)^2\right]^2}{\sum_{l=1}^{L}\sum_{p=1}^{L}\left[\lambda(l)\lambda(p)\frac{\sin^2(l-p)(g\omega_r)}{(l-p)^2(g\omega_r)^2} + \frac{4\pi\Gamma_r}{g\omega_r}\frac{\sin al\omega_r \sin ap\omega_r \sin(l-p)g\omega_r}{al\omega_r \, ap\omega_r(l-p)g\omega_r}e^{-2\frac{(l-p)^2(\omega_r\sigma)^2}{c^2}}\right]}$$

(Eq. 1)

where $\mu$=normalized signal-to-noise ratio, that is, the signal-to-noise ratio improvement over that in the zero order channel alone.
$g$=one-half the gate width
$\omega_r$=pulse repetition frequency (angular)
$\Gamma_c$=signal-to-noise power ratio before demodulation
$L$=total number of channels exclusive of zero order channel
$l$=channel index number
$p$=index of another channel
$\lambda(l)$=index function: $\lambda(l)=1$ or 0 depending on whether $l$ is the index of a desired or undesired channel respectively.
$\lambda(p)$=index function of another channel: $\lambda(p)=1$ or 0 depending on whether $p$ is the index of a desired or undesired channel respectively.
$a$=one-half the signal pulse width
$e$=base of natural logarithms
$\sigma$=standard deviation of $R_N$
[1]$R_N$=random part of range It is obvious that the computations very quickly become quite unwieldy for even a small number of channels. The expression may be simplified if the use of only two channels—the first order channel and one more—is first considered. Equation 1 then becomes $$\mu = \frac{2\left(1+\frac{4\pi\Gamma_c}{g\omega_r}\right)\left[\frac{\sin^2 a\omega_r}{(a\omega_r)^2}+\frac{\sin^2 ak\omega_r}{(ak\omega_r)^2}\right]^2}{2+2\frac{\sin^2(k-1)g\omega_r}{(k-1)^2(g\omega_r)^2}+\frac{4\pi\Gamma_c}{g\omega_r}\left[\frac{\sin^2 a\omega_r}{(a\omega_r)^2}+\frac{\sin^2 ak\omega_r}{(ak\omega_r)^2}+2\frac{\sin ak\omega_r \sin a\omega_r \sin(k-1)g\omega_r}{(k-1)ka^2g\omega_r^3}e^{-\frac{2\omega_r^2\sigma^2(k-1)^2}{c^2}}\right]}$$

(Eq. 2)

[1] (The range, R, of any reflecting spot at any time $t$ may be considered to be made up of two components, the predictable component, $R_S$ and a random component, $R_N$ so that $R=R_S+R_N$).

where the symbols are the same as for Equation 1 and, additionally, $k$=index of the desired channel in addition to the first.

Figure 9:
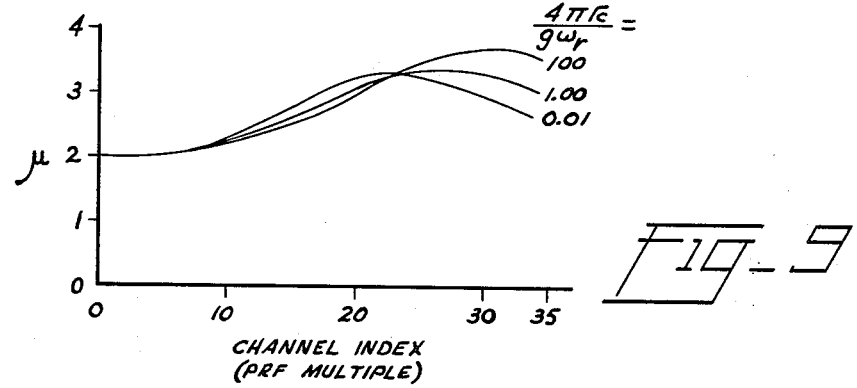
FIGURE 9 is a series of curves showing the signal-to-noise improvement obtainable in accordance with the invention.

FIGURE 9 is a graph of Eq. 2 for a particular case where $a=10^{-7}$ seconds, $\omega_r=\pi \times 10^5$ radians per second, and
$g=4a$ It is seen that, for strong signals $$\left(\frac{4\pi\Gamma_c}{g\omega_r}=100\right)$$

optimum results with two channels are obtained by using the thirty-first channel in addition to the first, while with weak signals $$\left(\frac{4\pi\Gamma_c}{g\omega_r}=0.01\right)$$

optimum results are obtained by using the first and twenty-third channels.

It is with weak signals that the improvement in signal-to-noise ratio is most important and in this case an approximation may be made. Referring to Eq. 2, for very small values of $\Gamma c$ the denominator has a minimum at the point where $$\frac{\sin^2 (k-1)g\omega_r}{(k-1)^2(g\omega_r)^2}=0$$

This is not necessarily a maximum point of $\mu$ since the numerator may decrease for larger values of $k$ more rapidly than the denominator increases, but if $a\omega_r$ is very small and $g\omega_r$ several times larger, the maximum of $\mu$ will occur very nearly for $$k=1+\frac{\pi}{g\omega_r} \qquad (3)$$

Using the same example as used in plotting FIG. 9, that is, $a=10^{-7}$ seconds
$\omega_r=\pi \times 10^5$ radians per second
$g=4a$ Equation 3 yields the value $k=26$ for maximum $\mu$. This value checks quite well with the value of 23 obtained from the curve of FIG. 9 where $$\frac{4\pi\Gamma_c}{g\omega_r}=0.01$$

and checks almost exactly with the intermediate curve where $$\frac{4\pi\Gamma_c}{g\omega_r}=1.00$$

In either case, the value of 23 is near the optimum value since the curves of $\mu$ have a rather flat peak. It is therefore seen that excellent results can be obtained by using the approximate expression of Eq. 3.

If two additional channels are used together with the first order channel, the process required to locate the maximum signal-to-noise ratio becomes several orders of magnitude more difficult since there are now two independent variables. It seems reasonable, though, to suppose that the third channel should have about the same separation from the second as the second had from the first. On the basis of this assumption $\mu$ has been computed from Eq. 1 for the case of $\Gamma c=\infty$ using channel Nos. 1, 31, and 61, and found to be 4.32. It has not been demonstrated that this is the maximum value; but since the curves of $\mu$ have fairly flat peaks, it seems reasonable to assume that it is close to the best value.

It would, of course, be possible to extend the analysis to the use of more than three channels. However, in many cases, the signal power added by additional channels becomes so small that it is unlikely that much more improvement can be secured. In the example previously considered the pulse width=$d=2a=2\times10^7$ seconds, or 0.2 microsecond.

$$\frac{1}{d}$$

therefore equals 5 megacycles. From FIG. 4 it can be seen that the sidebands separated by 5 megacycles per second from $f_T$, the transmitter frequency, have zero amplitude. This means that, after demodulation, the sidebands have zero amplitude at a frequency of 5 megacycles per second. In the example considered, $\omega_r=\pi\times10^5$ radians per second, the pulse repetition frequency is 50 kc./s. and there are $$\frac{5\times10^6}{50\times10^3}$$

or 100 multiples of the pulse repetition frequency within this 5 megacycles per second frequency range. Therefore, channel 100 has zero amplitude and it can be seen from FIG. 4 (and also from FIG. 10, to be discussed later) that those channels between 60 and 100 times the pulse repetition frequency have a comparatively small amplitude.

Figure 10:
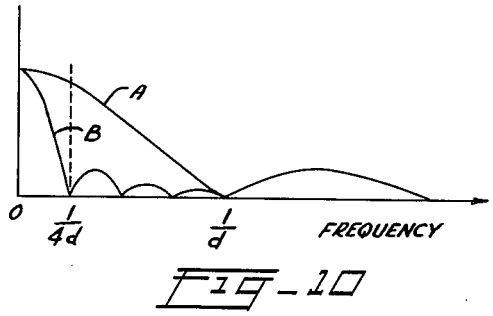
FIGURE 10 shows the envelope of the sidebands in the spectrum of a train of pulses after coherent demodulation and also the spectrum of the noise in the presence of a time gate.

The foregoing explanation based on Equations 1 and 2 is very accurate but somewhat difficult to grasp. FIGURE 10 aids one in realizing that the results previously attained are reasonable.

As previously explained, a train of pulses, such as is shown in FIG. 2, has a frequency spectrum, after coherent demodulation, as shown in FIG. 6. Curve A of FIG. 10 shows the envelope of such a spectrum drawn with a smaller frequency scale (a scale comparable to that used in drawing FIG. 4). The sidebands at frequencies of $$\frac{1}{d}, \frac{1}{2d}, \frac{1}{3d} \text{ etc.}$$

where $d$ is the pulse width, have zero amplitude. The ordinates represent power and therefore appear on the positive side of the axis.

Curve B of FIG. 10 represents the envelope of the frequency spectrum of the noise within a gate, such as the gate shown in FIG. 8, which is four times as wide as the pulse. This noise spectrum has zero amplitude at frequencies of $$\frac{1}{4d}, \frac{1}{8d}, \frac{1}{12d} \text{ etc.}$$

It seems reasonable to expect the use of sidebands near the frequency where curve B is zero would result in a favorable signal-to-noise ratio. In this specific case, where the gate has four times the width of the pulse, one would expect a favorable sideband at one-fourth the distance from zero to the first sideband of curve A having zero amplitude. In the example previously considered, where there are 100 multiples of the pulse repetition frequency in a frequency increment of $$\frac{1}{d}$$

one would expect the 25th channel to be a favorable one, and reference to FIG. 9 shows that this is, indeed, the case.

The foregoing explanation, although far from rigorous, does show in a qualitative way, that the results obtained by the more accurate analysis are reasonable.

We may summarize briefly at this point by noting, under the conditions assumed in obtaining the approximate expression of Eq. 3, ($a\omega_r$ very small, $g\omega_r$ several times larger, small values of $\Gamma c$) in the case where but one channel is to be used in addition to the first order channel, that the optimum channel depends primarily on the width of the gate and the pulse repetition frequency. As the gate becomes wider it reaches a limiting value equal to the pulse repetition frequency $$\left(g=\frac{\pi}{\omega_r}\right)$$

which corresponds to no gate at all and in the case $k=2$. In other words, the use of adjacent channels yields the greatest improvement in signal-to-noise ratio. As the gate becomes narrower, finally being equal to the pulse width, ($g=a$) the squared noise term $$\frac{\sin^2(k-1)g\omega_r}{(k-1)^2(g\omega_r)^2}$$

in Eq. 2 has a minimum when $k$ is in the neighborhood of $$\frac{\pi}{a\omega_r}$$

Actually the minimum occurs when $$k-1=\frac{\pi}{a\omega_r}$$

but since, in the specific example previously used for illustrative purposes, $$\frac{\pi}{a\omega_r}=100$$

it is seen that the squared noise term is near its minimum when $$k=\frac{\pi}{a\omega_r}$$

But for this value of $k$ the numerator of Eq. 2 is also a minimum, so there is no increase in $\mu$. This explanation is only approximate but it does furnish an additional indication that if the gate and the signal pulse widths are equal no further signal-to-noise ratio improvement is possible by the use of additional sidebands.

Referring now to FIG. 11 for apparatus for practicing the invention, there is shown a pulse repetition frequency generator 21, which may be a vacuum tube oscillator, for generating the pulse repetition frequency. The generator 21 operates a pulse forming circuit, or modulator, 22 which in turn triggers the microwave oscillator 23 so as to generate a series of pulses to be transmitted. The microwave pulses from the oscillator 23, which may be a magnetron, pass through a duplexer 24, which may comprise the usual TR and ATR switches, to the antenna 25. Return pulses reflected from an object are picked up by the antenna 25 and pass through the duplexer 24 to a mixer and detector 26 where they are converted to an intermediate frequency with the aid of a stable local oscillator 27. The signals are then amplified by an intermediate frequency amplifier 28 and are then coherently detected in a mixer and detector 29. A mixer and detector 30 receives signals from both the power oscillator 23 and the stable local oscillator 27 and produces an output equal in frequency to that of the output of the mixer 26. The output of mixer 30 rephases a coherent oscillator 31 at every transmitter pulse and the signal from oscillator 31 is led to the mixer 29 so as to obtain a coherently demodulated video signal output.

The video signal from the mixer and detector 29 is next passed through a range gate, or time gate, which may comprise an early gate 32 and a late gate 33. The early gate 32 allows the signal to pass during a fixed interval of time beginning sometime after the transmission of each pulse and the late gate 33 allows the signal to pass for an equal interval of time beginning at the end of the early gate. The amount of power passed by each gate is compared in a comparing circuit 34 the ouput of which operates a gate control circuit 35 which adjusts the starting time of the gates 32 and 33. For example, if more power obtaining a coherently demodulated video signal and other arrangements could be employed. For example, airborne Doppler navigation systems may obtain a coherently demodulated output by transmitting two beams, one directed forward and one aft, and by mixing the echoes from the two beams. As another example, a continuous wave oscillator at the transmitter frequency may be followed by a pulsed power amplifier and the output of which is radiated. The continuous wave oscillator is then available to obtain coherent demodulation. Many other modifications will occur to those skilled in the art.

What is claimed is:

1. A radar instrument comprising, means for transmitting a series of pulses of radio energy, means for receiving pulse echoes reflected from an object, means for allowing passage of said pulse echoes during only a portion of the time interval between transmitted pulses, means for deriving from said pulse echoes a plurality of video signals containing energy in discrete frequency bands separated from each other by multiples of the pulse repetition frequency, means for selecting a plurality of said bands separated from each other in frequency by a factor approximately equal to the ratio of the pulse repetition period to the duration of said portion of said time interval, and means for combining the energy in said plurality of bands.

2. A radar instrument having an improved signal-to-noise ratio comprising, means for transmitting a series of pulses of radiant energy, means for receiving a portion of said energy after reflection from an object, means for demodulating the received energy to obtain a video signal, gate circuit means for allowing passage of said video signal during only a portion of the time interval between transmitted pulses, means for separating said video signal into a plurality of frequency bands separated from each other by a factor determined by the pulse repetition frequency and the duration of said portion of said time interval, and means for combining the energy in said bands to form a composite signal.

3. Apparatus according to claim 2 in which said factor is approximately equal to the ratio of the pulse repetition period to the width of the gate.

4. A radar instrument comprising, means for transmitting a series of pulses of radiant energy, means for receiving pulse echoes reflected from an object, means for coherently demodulating said pulse echoes to obtain a video signal containing energy in discrete frequency bands separated from each other by multiples of the pulse repetition frequency, gate circuit means for allowing passage of said video signal during only a portion of the time interval between transmitted pulses, means for selecting two of said bands separated from each other by a number of bands approximately equal to the ratio of the pulse repetition period to the duration of said portion of said time interval, and means for combining the energy in said two frequency bands.

5. A radar instrument comprising, means for transmitting a series of pulses of radiant energy, means for receiving a portion of said energy after reflection from an object, means for coherently demodulating the received energy whereby there is obtained a video signal containing energy in a plurality of frequency bands separated by multiples of the pulse repetition frequency, gate circuit means for passing said video signal during only a portion of the time interval between transmitted pulses, means for selecting a plurality of said bands separated by a multiple of the pulse repetition frequency, said multiple being a function of the width of the gate and the pulse repetition frequency, and means for combining the energy in said selected bands.

6. A radar instrument comprising, means for transmitting a series of pulses of radiant energy, means for receiving a portion of said energy after reflection from an object, means for coherently demodulating the received energy whereby there is obtained a video signal containing energy in a plurality of frequency bands separated by multiples of the pulse repetition frequency, gate circuit means for passing said video signal during only a portion of the time interval between transmitted pulses, a first transmission channel for passing the lowest frequency band, additional transmission channels each for passing a frequency band centered about different multiples of the pulse repetition frequency, said multiples being a function of the pulse repetition frequency and the width of the gate, and means for combining the outputs of said transmission channels.

7. A radar instrument comprising, means for transmitting a series of pulses of radiant energy, means for receiving a portion of said energy after reflection from an object, means for coherently demodulating the received energy whereby there is obtained a video signal containing energy in a plurality of frequency bands separated by the pulse repetition frequency, gate circuit means for passing said video signal during only a portion of the time interval between transmitted pulses, a first transmission channel for passing that frequency band centered about the pulse repetition frequency, additional transmission channels each for passing a frequency band centered about different multiples of the pulse repetition frequency, said multiples being a function of the pulse repetition frequency and of the width of the gate, and means for combining the outputs of said transmission channels.

8. A radar instrument comprising means for transmitting a series of pulses of radiant energy, means for receiving a portion of said energy after reflection from an object, means for coherently demodulating the received energy whereby there is obtained a video signal containing energy in a plurality of frequency bands separated by the pulse repetition frequency, gate circuit means for passing said video signal during only a portion of the time interval between transmitted pulses, a first transmission channel for passing that frequency band centered about the pulse repetition frequency, a second transmission channel for passing a frequency band centered about a multiple of the pulse repetition frequency, said multiple being a function of the pulse repetition frequency and of the width of the gate, and means for combining the outputs of said first and second transmission channels.

9. In a radar system in which a repetitive series of pulses of radiant energy are transmitted toward an object and received after reflection therefrom and in which a range gate allows passage of energy through the receiver for only a portion of the time interval between transmitted pulses, apparatus for improving the signal-to-noise ratio comprising, a plurality of band-pass filters connected in parallel to the output of said receiver, the pass band of the first filter being centered about the pulse repetition frequency and the pass band of the remaining filters being centered about selected multiples of the pulse repetition frequency which multiples are functions of the pulse repetition frequency and of the width of the gate, and means for combining the outputs of said band-pass filters.

10. In a radar system in which a repetitive series of pulses of radiant energy are transmitted toward an object and received after reflection therefrom and in which a range gate allows passage of energy through the receiver for only a portion of the time interval between transmitted pulses, apparatus for improving the signal-to-noise ratio comprising, a first band-pass filter connected to the output of said receiver for passing a band of frequencies centered about the pulse repetition frequency of the transmitter, means for deriving from the output of said band-pass filter a signal which is reduced in frequency by the pulse repetition frequency, a second band-pass filter connected to the output of said receiver for passing a band of frequencies centered about a predetermined multiple of the pulse repetition frequency, said predetermined multiple being selected in accordance with is passed by the early gate, the control circuit 35 starts the gates sooner so as to cause the gates to "straddle" the video signal. A time reference signal is fed to the gate control circuit 35 from the modulator 22. The outputs of gates 32 and 33 are also combined in an adding circuit 36 to form a composite, range gated video signal which is passed to the remainder of the apparatus via the transmission line 37.

The apparatus so far described is quite conventional and the signal in the transmission line 37 contains velocity information in the form of the frequency spectrum of the signal and range information in the form of the time of occurrence of the signal with respect to the time of transmission of the pulses. However, it should be pointed out that no low pass filter follows the detector 29 so that the signal in line 37 is a wide band signal containing components from zero frequency to many times the pulse repetition frequency. Many radar systems pass the signal through a low-pass filter having a cutoff on the order of one-half the pulse repetition frequency thus eliminating the pulse repetition frequency and all of its harmonics and leaving only the sideband 41 of FIG. 6 in the case of a stationary target, or sideband 42 of FIG. 7 in the case of a moving target.

In the present system, all of the sidebands illustrated in FIGS. 6 and 7 are present in the transmission line 37 and certain of these sidebands are selected for utilization. It will be recalled that the signal-to-noise ratio in the first order channel is more favorable than that in the zero order channel. Accordingly, a band-pass filter 46 is provided to select this band from the signal in line 37. The targets in general will not be stationary but will have some velocity with respect to the radar system and the sidebands 43 and 44 will be displaced from the PRF, as shown in FIG. 7. As the target velocity increases the separation becomes greater. The filter 46 must pass all frequencies from that of sideband 43 to that of sideband 44 in order to accommodate targets having various velocities. For example, if target velocities up to 500 m.p.h. are to be accommodated and the transmitter frequency is $10^4$ mc., the maximum Doppler frequency will be $$D=\frac{2vf}{c}$$

or approximately 15 kc. and the filter 46 must pass all of the frequencies appearing within 15 k.c. of either side of the PRF. If the PRF is 50 kc., then filter 46 should pass the band from 35 kc. to 65 kc.

The output of filter 46 is passed to a mixer and detector 47 where it is mixed with the pulse repetition frequency obtained from the PRF generator 21 to obtain a signal containing the Doppler frequency.

The signal from transmission line 37 is also led to a second band-pass filter 51 which selects the second desired channel, whose order is designated as M. The order of the channel is selected in the manner previously explained, using either the accurate Equation 2 or the approximate Equation 3. For example, if the second selected channel is the thirty-first, $M=31$ and the filter 51 is designed to pass the band including the Mth multiple of the PRF plus and minus the maximum Doppler frequency. The output of filter 51 is led to a mixer and detector 52 where it is mixed with a signal having a frequency of M times the PRF obtained from a frequency multiplier 53 driven by the generator 21.

In a similar fashion, the signal in transmission line 37 is also led to a band-pass filter 56 which passes the third selected channel, whose order is designated as N. The pass band is selected in a manner analogous to that of filter 51. The output of filter 56 is led to a mixer and detector 57 where it is mixed with a signal whose frequency is N times the PRF, obtained from a frequency multiplier 58 driven by the PRF generator 21.

Additional channels may be utilized by providing components similar to those used for the M and N order channels, although in many cases it may be found that three, or even two, channels are sufficient to obtain excellent results.

The outputs of the three mixers and detectors 47, 52 and 57 and of any additional like mixers if more channels are used, are combined in an adding circuit 61 to form a composite output signal which is then passed through a low-pass filter 62 which preferably has a cut-off frequency approximately equal to the maximum expected Doppler frequency so as to remove the higher frequency terms. The output of the filter 62 is led to a frequency tracker 63 which derives velocity information from the signal. The frequency tracker 63 may be any of several types and is essentially a device for determining the center frequency of the Doppler spectrum and for generating a signal equal or proportional thereto. One suitable frequency tracker is described in the copending application Serial No. 314,306 of Gray, Newsom and Crane, filed October 11, 1952 for Automatic Signal Frequency Tracker, now U.S. Patent No. 2,856,519; another is described in the copending application Serial No. 368,792 of Gray and Newsom, filed July 17, 1953 for Automatic Signal Frequency Tracker, now U.S. Patent No. 2,870,331; and another is described in the copending application Serial No. 371,608 of Newsom and Huntington, filed July 31, 1953 for Frequency Tracker, now U.S. Patent No. 2,896,074.

The output of the frequency tracker 63 is preferably used to aid in controlling the operation of the gates 32 and 33. Such an arrangement is especially useful in a ground control approach system in which the system "looks" at the target only periodically. To this end the output of the frequency tracker 63 is fed back to the gate control circuit 35. The latter circuit also receives information regarding range from the comparing circuit 34, and the starting time of the gates is varied continuously in accordance with both the range information and the velocity information. The details of such a circuit are not a part of the present invention, but may, for example, be similar to those described in Patent No. 2,688,743 to Berger and Tull.

In the present invention, the use of several sidebands permits the accurate determination of velocity in spite of a low signal-to-noise ratio thereby improving the control of the range gate with the result that both range and velocity can be determined in the presence of a lower signal-to-noise ratio than has heretofore been possible. Both range and velocity may, of course, be visually displayed by the use of well known techniques.

At present it is preferred to use the first order channel, as shown in FIG. 11, rather than the zero order channel. However, this is not essential and somewhat simpler instrumentation is possible if the zero order channel is used, as shown in FIG. 12.

Figure 12:
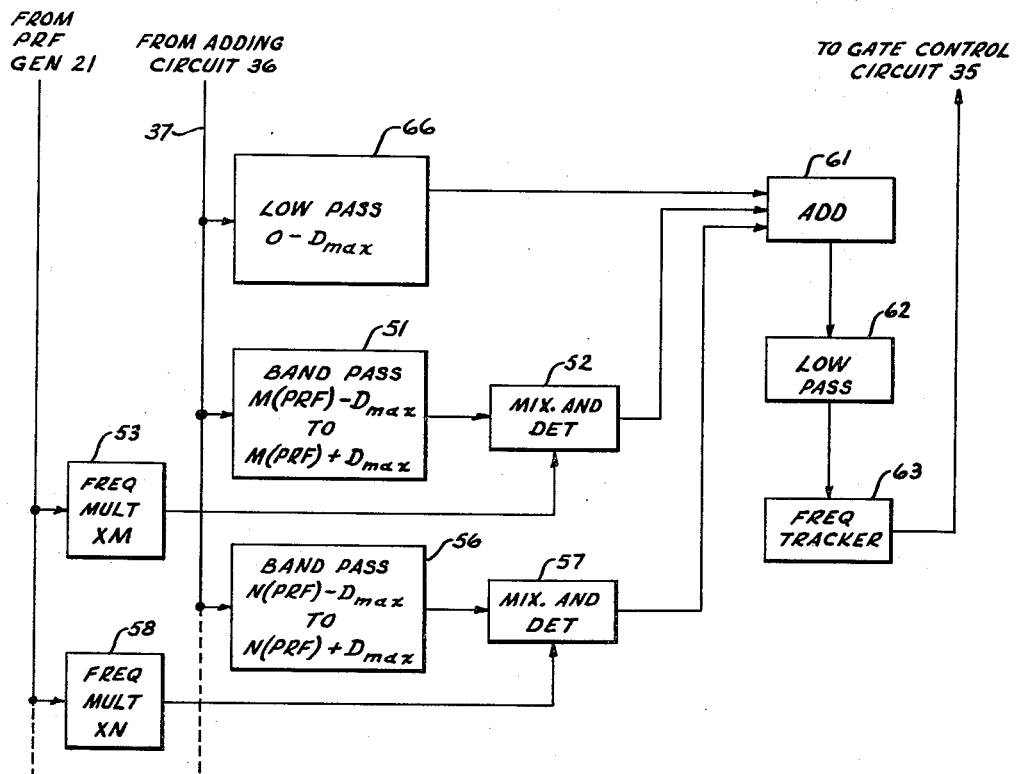
FIGURE 12 is a block diagram of a modification of the invention.

Referring now to FIG. 12, it is seen that the band-pass filter 46 and the mixer and detector 47 have been replaced by a low-pass filter 66 connected to the transmission line 37 which carries the wideband video signal. The filter 66 should pass those frequencies up to the maximum expected Doppler frequency and attenuate all higher frequencies. The output of the filter 66 is led directly to the adding circuit 61. The remainder of the circuit may be shown in FIG. 11.

The invention is applicable to radar systems in which the reflecting object is either stationary or moving. However, it is believed that it will find its greatest application in systems in which there is, or may be, relative movement between the reflecting object and the system because, for stationary reflecting objects, the signal-to-noise ratio may be improved more simply by using a narrow range gate. Similarly, the invention is not limited to systems which extract Doppler, or velocity, information from the signal although it is believed that it will have its widest application in this field.

Although a specific embodiment has been described, many modifications may be made within the scope of the invention. FIG. 11 illustrates but one arrangement for the pulse repetition frequency and the width of the gate, means for deriving from the output of said second band-pass filter a signal which is reduced in frequency by an amount equal to the center frequency of the pass band of said second filter, and means for combining said derived signals.

11. In a radar system in which a repetitive series of pulses of radiant energy are transmitted toward an object and received after reflection therefrom and in which a range gate allows passage of energy through the receiver for only a portion of the time interval between transmitted pulses, apparatus for improving the signal-to-noise ratio comprising, a low-pass filter connected to the output of said receiver for passing frequencies below the maximum expected Doppler frequency, a band-pass filter connected to the output of said receiver for passing a band of frequencies centered about a predetermined multiple of the pulse repetition frequency, said predetermined multiple being selected in accordance with the pulse repetition frequency and the width of the gate, means for deriving from the output of said band-pass filter a signal which is reduced in frequency by an amount equal to the center frequency of the pass band of said band-pass filter, and means for combining said derived signals.

12. In a radar system in which a repetitive series of pulses of radiant energy are transmitted toward an object and received after reflection therefrom and in which a range gate allows passage of energy through the receiver for only a portion of the time interval between transmitted pulses, apparatus for improving the signal-to-noise ratio comprising, a first band-pass filter connected to the output of said receiver for passing a band of frequencies centered about the pulse repetition frequency of the transmitter, first means for mixing the output of said first filter with a voltage the frequency of which is equal to the pulse repetition frequency, a second band-pass filter connected to the output of said receiver for passing a band of frequencies centered about a predetermined multiple of the pulse repetition frequency, second means for mixing the output of said second filter with a voltage the frequency of which is equal to that of the pulse repetition frequency times said multiple, and means for combining the outputs of said first and second means.

13. In a radar system in which a repetitive series of of pulses of radiant energy are transmitted toward an object at a rate determined by a pulse repetition frequency generator and which pulses are received after reflection by said object and in which a range gate allows passage of energy through said receiver for only a portion of the time interval between transmitted pulses, apparatus for improving the signal-to-noise ratio comprising, a first band-pass filter connected to the output of said receiver for passing a band of frequencies centered about the pulse repetition frequency, a first mixing circuit for mixing the output of said first filter with a voltage derived from and equal in frequency to that of said generator, a second band-pass filter for passing a band of frequencies centered about a selected multiple of the pulse repetition frequency, said multiple being a function of the pulse repetition frequency and of the width of the gate, a frequency multiplier for deriving from said generator a voltage the frequency of which is equal to the pulse repetition frequency multiplied by said selected multiple, a second mixing circuit for mixing the output of said second band-pass filter with the output of said frequency multiplier, an adding circuit for combining the outputs of said first and second mixing circuits, and a low-pass filter connected to the output of said adding circuit for attenuating frequencies higher than one-half the pulse repetition frequency.

References Cited in the file of this patent

UNITED STATES PATENTS

| | | |
|---|---|---|
| 2,416,895 | Bartelink | Mar. 4, 1947 |
| 2,629,049 | Miller | Feb. 17, 1953 |
| 2,688,743 | Berger et al. | Sept. 7, 1954 |
| 2,740,963 | Shuler et al. | Apr. 3, 1956 |